March 19, 1963 L. H. FREEDMAN 3,082,413
WARNING DEVICE FOR LINEAR SPEEDOMETER
Filed July 18, 1960 2 Sheets-Sheet 1
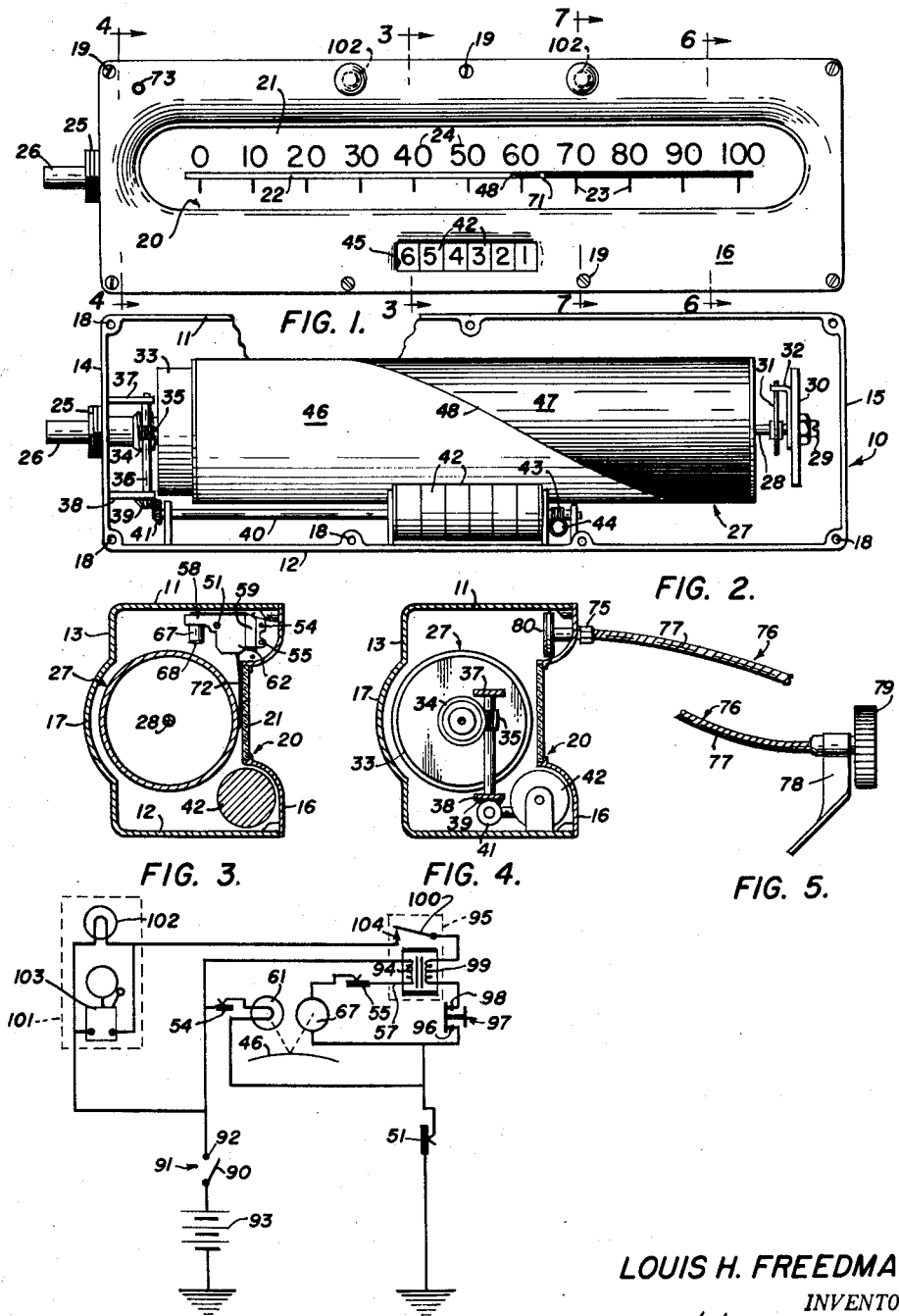
LOUIS H. FREEDMAN
INVENTOR.
BY *Herbert J. Brown*
ATTORNEY March 19, 1963   L. H. FREEDMAN   3,082,413
WARNING DEVICE FOR LINEAR SPEEDOMETER
Filed July 18, 1960   2 Sheets-Sheet 2
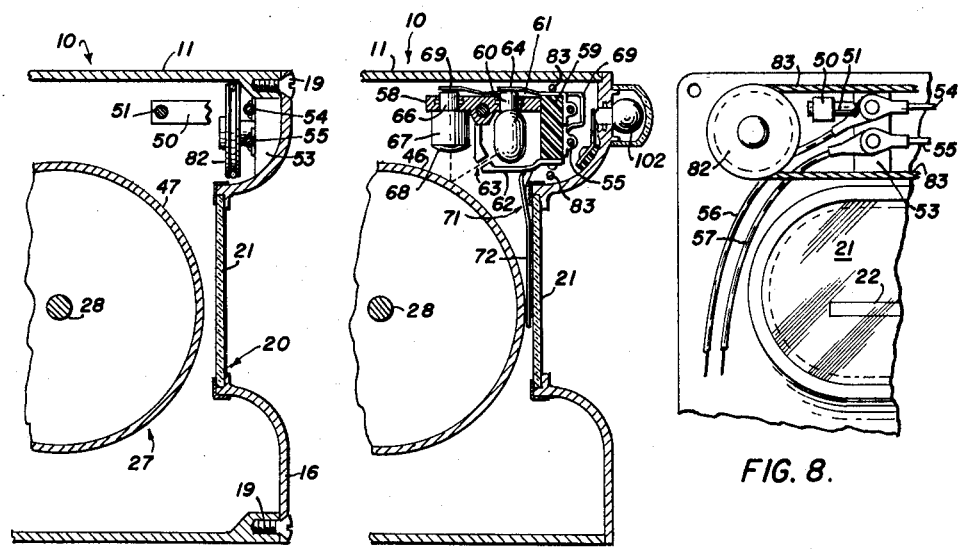
FIG. 6.   FIG. 7.   FIG. 8.
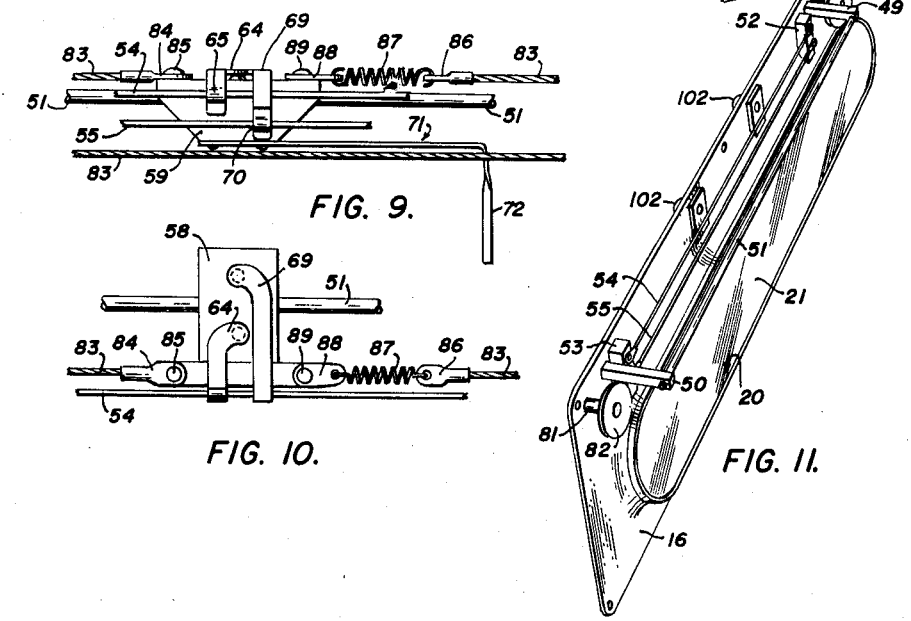
FIG. 9.
FIG. 10.   FIG. 11.
LOUIS H. FREEDMAN
INVENTOR.
BY
ATTORNEY

United States Patent Office 3,082,413
Patented Mar. 19, 1963

3,082,413
WARNING DEVICE FOR LINEAR SPEEDOMETER
Louis H. Freedman, 1416 Continental Life Bldg.,
Fort Worth, Tex.
Filed July 18, 1960, Ser. No. 43,607
6 Claims. (Cl. 340—263)

This invention relates to speed warning devices for vehicles and has reference to an alarm which coacts with a linear type speedometer.

Construction of limited access highways and turnpikes has made it possible for a driver to travel great distances without interruptions at intersections and traffic signals. Forearmed with the knowledge that no impediments will lie in his path, a traveler need only concentrate on keeping his own automobile in a proper lane and avoiding collision with cars in his immediate vicinity; under these circumstances many drivers lose awareness of their speed and tend, over a period of time, to gradually increase their velocity beyond legal limits. In some states, the penalty for this offense, however, unintentional, is very costly and may lead to revocation of a driver's license which, in itself, can entail severe economic hardship. Another possible result of prolonged travel on a turnpike is the possibility that a lack of irregular interruptions will induce drowsiness and eventual sleep. This well known hazard, sometimes referred to as "highway hypnosis," has been the object of many corrective measures and suggestions. One of the most dangerous aspects of sleep brought about by monotonous driving conditions is that a driver may accelerate rather than decelerate his vehicle upon falling asleep at the wheel and may attain excessive speed before leaving the roadway.

An alarm system, preset to sound a warning when a driver has reached a predetermined speed, would be useful in deterring or eliminating both of the problems mentioned above, more particularly an alarm system requiring a conscious act for its discontinuance could further insure that a driver has been aroused from his sleep or has positive knowledge of his traffic violation. One of the difficulties of constructing an alarm system which coacts with an automobile's speedometer is that the auxiliary mechanism may impair operation of the speedometer so that the accuracy of both become unreliable. Another problem stems from the possibility that the conscious act required of the driver to shut off an alarm may be performed while an automobile is traveling at a speed exceeding the actuation velocity of the alarm's control system so that the alarm becomes inoperable unless the driver decelerates to the predetermined speed at which the alarm is actuated; reference is made to my Patent No. 2,771,597 wherein an alarm system for a needle type speedometer is disclosed and to my co-pending application Serial No. 632,287 filed January 3, 1957, now Patent Number 2,964,741 in which a warning device for a cylinder type speedometer is disclosed where this possibility is present.

An object of a present invention is to provide a warning device for a linear type speedometer and which device may be constructed separately from the speedometer mechanism so that its inclusion in an automobile may be made optional.

Another object of the invention is to provide a speed alarm for an automobile and which alarm may be preset in conjunction with the automobile's speedometer for actuation upon the attainment of a given speed.

A further object of the invention is to provide, for an automobile, a warning device co-active with the automobile's speedometer but void of any physical contact therewith.

A further object of the invention is to provide a warning device which may be mounted within the speedometer case of an automobile.

Another object of the invention is to provide a speed warning device utilizing selective reflection from the cylinder of a linear speedometer but wherein incidental or transient light will not actuate the alarm system.

A particular object of the invention is to provide a speed warning device which will be actuated at any speed greater than a speed preselected and set by a driver.

A further object of the invention is to provide, for an automobile, a speed alarm which may be either entirely inactivated or only temporarily inactivated by a conscious act of the driver whose automobile has exceeded a predetermined velocity.

These and other objects will become apparent from the following description and the accompanying drawings, wherein:

FIGURE 1 is a front elevational view of a linear type speedometer having the present invention coactively constructed therewith.

FIGURE 2 is a fragmentary front elevational view of a linear type speedometer as illustrated in FIGURE 1, but having its front cover removed.

FIGURE 3 is a sectional view taken along line 3—3 in FIGURE 1.

FIGURE 4 is a sectional view taken along line 4—4 in FIGURE 1.

FIGURE 5 is a fragmentary and side elevational view of a control knob, control cable, and mounting bracket of the invention.

FIGURE 6 is an enlarged sectional view taken along line 6—6 in FIGURE 1.

FIGURE 7 is an enlarged sectional view taken along line 7—7 in FIGURE 1.

FIGURE 8 is a fragmentary rear elevational view of the front cover of the speedometer case illustrated in FIGURE 1 and showing component parts of the invention mounted thereon.

FIGURE 9 is a front elevational view of the traveling plate and associated parts of the invention.

FIGURE 10 is a plan view of the components illustrated in FIGURE 9.

FIGURE 11 is a perspective view of the inner side of the front cover of the speedometer case illustrated in FIGURE 1.

FIGURE 12 is a schematic diagram showing an exemplary electrical circuit of the invention.

In the drawings, a speedometer case, generally designated by the numeral 10, is of rectangular box like construction having top, bottom, rear and side walls 11, 12, 13, 14 and 15 integrally constructed with one another and having a forward wall 16 detachably secured thereto. The longest dimension of the case 10 extends between its side walls 14 and 15, and the rear wall 13 of the case 10 includes a central portion 17 arched rearwardly away from the remainder of the case on an axis parallel with the greatest dimension thereof. The case 10 is adapted to be mounted interiorly of the dashboard of an automobile (not shown) and with the forward wall 16 of the case 10 positioned toward the driver; hence, one side wall 14 of the case 10 is directed toward the left (or driver's side) of the automobile whereas the other side wall 15 is directed toward the right hand side. A plurality of ears 18, each having a threaded opening therein, are positioned at the forward edge of the forward portion of the case 10, and screws 19 projecting rearwardly through the forward wall 16 of the case 10 threadedly engage the openings in the ears 18. A rearwardly depressed opening 20 is formed in the forward wall 16 of the case 10 and a flat face plate 21 is attached to the perimeter of the depressed opening so that the face plate is disposed parallel with the periphery of the forward wall of the case 10 but is positioned rearwardly thereof. Over most of its surface, the face plate is opaque, but an elongate horizontal strip therein is formed as a transparent aperture 22 through which the interior of the case 10 is visible. Immediately beneath the transparent aperture 22 are vertical marker lines 23 calibrated in miles per hour, and immediately above the transparent aperture are appropriate indicia 24 identifying the markers there beneath.

The speedometer mechanism mounted within the case 10 may be of any conventional rotating cylinder type. In a typical form of construction, a threaded coupling base 25 is exteriorly attached to the side wall 14 on the left side of the case 10, and a high speed shaft 26 is journaled to the wall 14 through the coupling base 25. A rotatable cylinder 27 is coaxially mounted on a spindle 28 which extends between a bearing (not shown) carried by the high speed shaft 26 and an adjustable bearing 29 mounted on a bracket 30 at the right hand side of the case 10. Between the cylinder 27 and the bracket 30 a hairspring 31 is attached at one of its ends to the spindle 28 and at its other end to an arm 32 projecting from the bracket 30; at the other end of the cylinder a ring 33 of ferrous metal is coaxially attached to the cylinder 27 and extends over a portion of the high speed shaft 26. A magnet (not shown) is attached to the high speed shaft 26 for rotation within the ring 33. Exteriorly of the ring 33, a worm gear 34 is secured to the high speed shaft 26 and a pinion 35 engaging the worm gear 34 is coaxially affixed to a vertical shaft 36 journaled to horizontal posts 37 and 38 attached to the case 10. A bevel gear 39 is secured to the lower end of the vertical shaft 36 and a horizontal shaft 40, having a second bevel gear 41 in engagement with the bevel gear 39 on the vertical shaft 36, operates a set of mileage indicator wheels 42 through a second worm gear 43 and pinion 44. A window 45 is formed in the forward wall 16 of the case 10 opposite the mileage indicator wheels 42.

The surface of the cylinder 27 is divided into reflective and non-reflective areas 46 and 47; these areas intersect along a helix 48 of one revolution about the cylinder. The relative relationships of the separate areas of the surface of the cylinder 27 may be understood by considering the surface as a rectangle lying in a plane and having its length equal to the length of the cylinder and its width equal to the diameter of the cylinder; a diagonal line between opposite corners of the rectangle corresponds to the helix 48 on the surface of the cylinder and that portion of the rectangle lying between the diagonal corresponds to the reflective surface 46 on the cylinder whereas the portion above the diagonal corresponds to the non-reflective surface 47. When the speedometer reading is zero, the dividing helix 48 is opposite the zero marker on the speedometer face plate 21 and only non-reflecting material can be seen through the aperture 22 to the right of the zero mark. A metallic foil or polished metallic finish has been found to be especially satisfactory as a reflecting surface, and a flat paint of dark color has been found satisfactory as a non-reflecting surface; because the difference in the coefficients of reflection of the two areas is more important than their absolute values, a wide variety of colors and coating materials including paints, varnishes and inks are available as effective surface finishes for the cylinder 27.

Two rectangular posts 49 and 50, disposed parallel with one another, are attached to the forward wall 16 of the case 10 at positions respectively spaced from side edges and near the top edge thereof and project rearwardly and equidistantly therefrom. A guide rod 51 constructed as an elongate cylindrical bar, extends between and is attached to the projecting ends of the guide posts 49 and 50. The posts 49 and 50 and the guide rod 51 are in electrical contact with one another and with the forward wall 16 of the case 10 which, in turn, is in electrical contact with the chassis of the automobile. Insulating blocks 52 and 53 are attached to the rearward surface of the forward wall 16 of the case 10 at positions thereon inwardly spaced from the guide posts 49 and 50. Upper and lower slip rods 54 and 55 are positioned one above the other in parallel relationship and extend between and are attached to the insulating blocks 52 and 53. Each of the slip rods 54 and 55 is circular in section and each is electrically insulated from the other as well as from the case 10. An upper electrical lead 56 is secured to and electrically connected with one end of the upper slip rod 54, and a lower electrical lead 57 is similarly connected to the corresponding end of the lower slip rod 55. Each of the leads 56 and 57 is provided with insulation which prevents electrical contact with other parts of the case 10.

A traveling plate 58 disposed parallel with the top of the case 10 is positioned above the face plate 21 and forwardly of the spindle 28 of the cylinder 27 within the case 10; the traveling plate is slidably mounted on the guide rod 51 which is positioned within a lateral opening extending therethrough, and the traveling plate is constructed of electrical conducting material which makes electrical contact with the guide rod and is, therefore, in electrical contact with the chassis of the automobile. The upper edge of a rectangular insulating plate 59 is secured to the forward edge of the traveling plate 58 and extends downwardly therefrom in spaced relationship with that portion of the case 10 above the face plate 21. A light socket 60 is formed in the traveling plate 58 at a position therein between the guide rod 51 and the insulating plate 59, and a light bulb 61, having its base received by the socket 60, projects downwardly from the traveling plate. An opaque case 62 is secured to the traveling plate 58 and to the insulating plate 59 about the light bulb 61 and a pin hole 63 is formed in the lower rear edge of the opaque case 62 opposite the bulb 61 to permit the projection of a spot of light through the opaque case to the speedometer cylinder 27. The perimeter of the base of the bulb 61 is in electrical contact with the traveling plate 58 and the guide rod 51. An electrically conducting strap 64 attached to the insulating plate 59 and spaced from the traveling plate 58 makes electrical contact with the conducting tip of the base of the bulb 61 at one of its ends and is formed at its other end as a brush 65 in sliding contact with the upper slip rod 54. A second socket 66 is formed in the traveling plate 58 and is located therein at a position rearwardly of the guide rod 51. A photoconductive cell 67 of the cadmium sulphide or any other commercially available type is provided with a light bulb type base which is received by the second socket 66 in the traveling plate 58 so that a lens 58 of the photoconductive cell is faced downwardly toward the speedometer cylinder 27. The relative positions of the light bulb 61 and pin hole 63 in the opaque case 62 and the lens 68 of the photoconductive cell 67 are such with respect to the surface of the speedometer cylinder 27 that equal angles of optical incidence and reflection, as indicated by dotted lines in FIGURE 7, are formed with a tangent to the surface of the speedometer cylinder. The perimeter of the base of the photoconductive cell 67 is in electrical contact with the traveling plate 58 and guide rod 51. A second electrically conducting strap 69 is attached to the insulating plate 59, and one of its ends extends to pressure contact with the conducting tip of the base of the photoconductive cell 67. The other end of the second conducting strap 69 is formed as a brush 70 in sliding contact with the lower slip rod 55. An L-shaped indicator arm 71 is secured to the lower end of the insulating plate 59 and projects to the right thereof (when viewed from the front as illustrated in FIGURE 9) and the projecting end 72 of the indicator arm 71 extends downwardly into the space between the speedometer cylinder 27 and the face plate 21 so that a portion at the projecting end 72 of the indicator arm 71 is visible through the elongate aperture 22 in the face plate 21.

A circular opening 73 (see FIGURE 1) is formed in the upper left hand corner of the forward wall 16 of the speedometer case 10 and a sleeve 74 having one of its ends smaller in diameter than the remainder thereof is positioned with its smaller end projecting forwardly through the circular opening. The female coupling 75 of a rotatable type control line 76, including a flexible but non-rotatable sheath 77, threadedly engages the forwardly projecting end of the sleeve 74. A clamp 78 secured to the steering column of an automobile engages the other end of the control line 71 and a control knob 79 is co-actively secured to the control line near the steering column. A pulley 80 is positioned within the speedometer case 10 at the rearwardly projecting end of the sleeve 74 and there is axially engaged by an end of the control line 76. A stub shaft 81 is attached to the rearward surface of the forward wall 16 of the speedometer case 10 in the upper right hand corner thereof and projects rearwardly in horizontal alignment with the axis of the sleeve 74. A second pulley 82 is journaled to the rearwardly projecting end of the stub shaft 81.

One end of a control cable 83 is provided with a shackle collet 84 pivotally connected by a pin 85 to an upper corner of the insulating plate 59 for angular displacement in a horizontal plane, and the control cable 83 extends therefrom to successive engagement with the pulleys 80 and 82. The other end of the control cable 83 is likewise provided with a shackle collet 86 which engages one end of a helical type tension spring 87; the other end of the tension spring engages a pivot plate 88 connected by a pin 89 to the upper edge of the insulating plate 59 for angular displacement in a horizontal plane.

Because one side of an automobile battery is generally grounded to the chassis, the guide rod 51 which is in electrical contact with the chassis of the automobile through the posts 49 and 50 and the case 10 of the speedometer may be considered as a ground connection. Hence, the perimeter of the base of the light bulb 61 is connected to ground through the traveling plate 58, which makes sliding electrical contact with the guide rod 51. The other terminal of the light bulb 61 is in electrical contact with the upper lead 56 connected to the upper slip rod 54 through its conducting strap 64 and the brush part 65 thereof which makes contact with the upper slip rod 54. The upper electrical lead 56 is connected to the armature 90 of a master switch 91 having its contact point 92 in electrical connection with the ungrounded post of the automobile battery 93. If desired, the contact point 92 of the master switch 91 may be connected to the ungrounded post of the battery 93 through the ignition switch (not shown) of the automobile. The base of the photoconductive cell 67 is likewise grounded through the traveling plate 58 and guide rod 51, and the other terminal of the photoconductive cell is electrically connected to the lower lead 57 through the lower slip rod 55 and the brush 70 of the second conducting strap 69. The lower electrical lead 57 is connected to one end of one coil 94 of a normally open single pole single throw relay 95 of the dual coil type. The other end of the first coil 94 of the relay 95 is electrically connected to the contact 92 of the master switch 91. One terminal 96 of a normally closed push-button type switch 97 is electrically grounded to the automobile chassis, and the other terminal 98 of the push-button switch 97 is connected to one end of the second coil 99 of the relay 95. The other end of the second coil 99 of the relay 95 is connected to the armature 100 of the relay. An alarm system, generally designated by the numeral 101, includes both visual and audible components such as lights 102 and a bell 103 wired in parallel with one another. One side of the alarm system 101 is wired to the contact point 104 of the single pole single throw relay 95, and the other side of the alarm system is wired to the contact 92 of the master switch 91.

In operation, the master switch 91 is closed manually when use of the alarm system is desired, and closing of the switch 91 energizes the light bulb 61 which casts a spot of light through the pin hole 63 in the opaque case 62 onto the surface of the speedometer cylinder 27. It should be remembered that the surface of the speedometer cylinder 27 is divided into reflecting 46 and non-reflecting 47 areas defining a helical intersection 48 thereon.

Assuming that the automobile is at rest and that the projecting end 72 of the indicator arm 71 is at the 64 miles per hour position as viewed through the elongate aperture 22 in the face plate 21, the angular position of the speedometer cylinder is then such that the junction 48 between the reflecting and non-reflecting areas 46 and 47 on its surface is opposite the zero mark, and the spot of light from the bulb 61 falls upon a non-reflecting portion of the surface of the speedometer cylinder. As the automobile is put into motion, the high speed shaft 26 is rotated by the speedometer cable (not shown) and the magnet on the high speed shaft urges the ring 33 and cylinder 27 in a counter clockwise direction with respect to FIGURES 3, 4, 6 and 7; the speedometer cylinder is, consequently, angularly displaced in a counter clockwise direction against a counter force exerted by the hairspring 31. As the speed of the automobile approaches 64 miles per hour, as illustrated in FIGURE 1, that portion of the junction 48 between reflecting 46 and non-reflecting 47 portions of the surface of the speedometer cylinder 27 visible through the elongate aperture 22 in the face plate 21 approaches the position of the projecting end 72 of the indicator arm 71; similarly, a portion of the junction 48 approaches the optical plane of the light bulb 61 and photoconductive cell 67 carried by the traveling plate 58 to the left of the projecting end 72 of the indicator arm 71. So long as the spot of light falls upon a non-reflecting portion 47 of the speedometer cylinder 27 the intensity of light reflected to the photoconductive cell 67 is insufficient to allow enough current to pass through the photoconductive cell and through the first coil 94 of the relay 95 to close the relay's armature 100. When, however, so much of the junction 48 of different surfaces 46 and 47 on the speedometer cylinder 27 visible through the elongate aperture 22 reaches alignment with the projecting and 72 of the indicator arm 71 the reflecting surface 46 of the speedometer cylinder 27 is simultaneously placed beneath the spot of light and reflected to the photoconductive cell 67 which then passes enough current through the first coil 94 of the relay 95 to attract and close the armature 100 and contact point 104 of the relay 95 allowing current to flow through the second coil 99 of the relay, and the relay is thus held in its closed position. Current flowing through the armature 100 of the relay 95 also flows through the alarm system 101, and the lights 102 and bell 103 are thus energized. The second coil 99 of the relay 95 keeps the armature 100 in contact with its contact point 104, even though speed of the automobile is decreased to a point where a non-reflecting portion 47 of the surface of the speedometer cylinder 27 is beneath the spot of light. The alarm system 101 may be turned off by manual operation of the push-button type switch 97 which breaks the circuit of the second coil 99 of the relay 95. To turn the alarm 101 off without resort to the master switch 91 (or the automobile's ignition key) two requirements must be met: First, the speed of the automobile must be reduced to a level where a non-reflecting part 47 of the surface of the speedometer cylinder 27 is beneath the spot of light, and, second, a conscious act has been performed by the driver, namely, depression of the push-button type switch 97. If the push-button type switch is depressed while the speed of the automobile exceeds the preset level shown by the indicator arm 71, the first coil 94 of the relay 95 will, none the less, be sufficiently energized through the photoconductive cell 67 to keep the armature 100 of the relay 95 against its contact point 104. If speed is reduced but the push-button type switch 97 is not depressed, the second coil 99 of the relay 95 will keep the armature 100 in its closed position.

The speed at which the alarm system 101 is actuated may be altered by rotation of the control knob 79 at the steering post. Rotation of the knob 79 results in rotation of one of the pulleys 80 by virtue of their common connection with the control line 76, and rotation of the first pulley 80 displaces the control cable 83 strung about both pulleys 80 and 82; displacement of the control cable 83 slides the traveling plate 58 to a new position along the guide rod 51. The tension spring 87 assures adequate frictional engagement between the control cable 83 and the pulleys 80 and 82, and the pivotal connections of the shackle collet 86 and pivot plate 88 to the insulating plate 59 prevent binding of the traveling plate 58 upon the guide rod 51 and compensate for possible misalignment between the guide rod 51 and the slip rods 54 and 55. It should be particularly noted that there is no frictional contact between the speedometer mechanism and the invention; coaction between the two is accomplished by optical means whereby accuracy of the speedometer mechanism is not impaired. It should also be noted that the speedometer may be used effectively without installation of the alarm system and that such installation may be accomplished by mere removal and modification of the forward wall 16 of the speedometer case 10. Hence, the invention may either be constructed as standard automotive equipment or may be considered as an accessory therefor; in either event, the invention may be installed or serviced without jeopardizing or impairing the accuracy of the speedometer.

Positioning of the face plate 21 rearwardly of the upper and lower portions of the forward wall 16 of the speedometer case 10 shields the photoconductive cell 67 from transient light and prevents reflection into the photoconductive cell of exterior light which may fall upon the cylinder 27.

The invention is not limited to the exemplary construction herein shown and described but may be made in various ways within the scope of the appended claims.

What is claimed is:

1. In a cylinder type speedometer, reflecting and non-reflecting areas on the surface of said cylinder with said areas having a junction defining a helix of one revolution about said cylinder, a light source mounted for displacement parallel with the axis of said cylinder, a light sensing device mounted in constant and spaced relationship from said light source and in a path of reflection of said light source from said cylinder, and means actuated by said light sensing device activating an alarm.

2. In combination with a speedometer including a case and having a cylinder angularly displaced about its axis in response to the speed of an automobile, a warning device comprising: a light source slidably mounted with respect to said case and along a line parallel with said axis of said cylinder, a photosensitive cell in fixed relationship with said light source and slidably mounted therewith and arranged to receive a reflection of said light source from said cylinder, an electrical alarm means, electrically connecting said alarm with said photosensitive cell, a light reflective area on said cylinder, and a non-reflective area on said cylinder with said reflective and non-reflective areas occupying substantially all of said surface of said cylinder and being separated thereon by a junction defining a helix of one revolution on said cylinder.

3. The invention as defined in claim 2 and, wherein said means electrically connecting said alarm with said photosensitive cell includes: electrically conducting rods supported by said case in a disposition parallel with said axis of said cylinder, a plate slidably mounted on said rods and supporting said light source and said photosensitive cell, means electrically connecting said photosensitive cell to said rods, and means electrically connecting said rods to said signal.

4. The invention as defined in claim 3 and including pulleys mounted on said case at opposite sides of and in alignment with the path of said plate. A control cable strung about said pulleys and attached at its opposite ends to said plate, and means selectively rotating one of said pulleys.

5. In a cylinder type speedometer, reflecting and non-reflecting areas on the surface of said cylinder with said areas having a junction defining a helix about said cylinder, a light source mounted for displacement parallel with the axis of said cylinder, a light sensing device mounted in constant and spaced relationship from said light source and in a path of reflection of said light source from said cylinder, and means actuated by said light sensing device activating an alarm.

6. In combination with a speedometer including a case and having a cylinder angularly displaced about its axis in response to the speed of an automobile, a warning device comprising: a light source slidably mounted with respect to said case and along a line parallel with said axis of said cylinder, a photosensitive cell in fixed relationship with said light source and slidably mounted therewith and arranged to receive a reflection of said light source from said cylinder, an electrical alarm, means electrically connecting said alarm with said photosensitive cell, a reflective area on said cylinder, and a non-reflective area on said cylinder with said reflective and non-reflective areas occupying substantially all of said surface of said cylinder and being separated thereon by a junction defining a helix on said cylinder.

References Cited in the file of this patent

UNITED STATES PATENTS

| 1,885,621 | Newill | Nov. 1, 1932 |
| 2,216,370 | Kirik et al. | Oct. 1, 1940 |
| 2,269,258 | Falkenberg | Jan. 6, 1942 |
| 2,802,442 | Helgeby | Aug. 13, 1957 |
| 2,964,741 | Freedman | Dec. 13, 1960 |

FOREIGN PATENTS

| 558,240 | Canada | June 3, 1958 |